United States Patent
Massarenti

(10) Patent No.: US 8,566,368 B2
(45) Date of Patent: Oct. 22, 2013

(54) GARBAGE COLLECTION EXTENSIBILITY VIA MANAGED CODE

(75) Inventor: Davide Massarenti, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 608 days.

(21) Appl. No.: 12/893,129

(22) Filed: Sep. 29, 2010

(65) Prior Publication Data

US 2012/0078982 A1    Mar. 29, 2012

(51) Int. Cl.
G06F 12/00 (2006.01)
G06F 17/30 (2006.01)

(52) U.S. Cl.
USPC .......................................... 707/819

(58) Field of Classification Search
USPC .......................................... 707/819
See application file for complete search history.

(56) References Cited

U.S. PATENT DOCUMENTS

| 5,088,036 | A | 2/1992 | Ellis et al. | |
|---|---|---|---|---|
| 5,398,334 | A | 3/1995 | Topka et al. | |
| 6,047,125 | A | 4/2000 | Agesen et al. | |
| 6,701,520 | B1* | 3/2004 | Santosuosso et al. | 717/152 |
| 7,114,045 | B1* | 9/2006 | Pliss et al. | 711/159 |
| 7,533,123 | B1 | 5/2009 | Dussud et al. | |
| 7,600,223 | B2 | 10/2009 | Massarenti et al. | |
| 7,620,943 | B1* | 11/2009 | Garthwaite | 717/140 |
| 7,707,232 | B2 | 4/2010 | Dussud et al. | |
| 2002/0078002 | A1 | 6/2002 | Bottomley et al. | |
| 2002/0138506 | A1* | 9/2002 | Shuf et al. | 707/206 |
| 2006/0085433 | A1* | 4/2006 | Bacon et al. | 707/100 |
| 2009/0112953 | A1* | 4/2009 | Barsness et al. | 707/206 |

OTHER PUBLICATIONS

Pawlan, Monica, "Reference Objects and Garbage Collection", Retrieved at << http://www.pawlan.com/monica/articles/refobjsl/ >>, Aug. 1998, p. 1.
"The Truth About Garbage Collection", Retrieved at >> http://java.sun.com/docs/books/performance/1st_edition/html/JPAppGC.fm.html >>, retrieved date: Jul. 5, 2010, pp. 8.
Richter, Jeffrey, "Garbage Collectionâ?"Part 2: Automatic Memory Management in the Microsoft .NET Framework, Retrieved at << http://msdn.microsoft.com/en-us/magazine/bb985011.aspx >>, retrieved date: Jul. 5, 2010, pp. 7.
"NSGarbageCollector Class Reference", Retrieved at << http://developer.apple.com/mad/library/...class/NSGarbageCollector_class.pdf >>, Oct. 15, 2008, pp. 14.

* cited by examiner

Primary Examiner — Fred I Ehichioya
Assistant Examiner — Kris Mackes
(74) Attorney, Agent, or Firm — Ogilvie Law Firm

(57) ABSTRACT

A garbage collector includes a core, and extension handlers to support collection of objects of a designated managed class. The handler, which may be implemented in managed code, receives notification of garbage collection phases, and receives control from the core when the core encounters an object of the designated class. The handler can then thread together discovered objects of the designated class, walk a list of objects and detect whether any are unreachable, and/or provide an executor for the designated class. The core notifies handlers about progress in tracing strong pointers, tracing weak pointers, pointer update, pinning, weak pointer forwarding, and untraced pointer relocation. A pointer can be marked as untraced, so the core ignores it during pointer tracing phases. If the core encounters an object which has a weak pointer field, the core can pass control to a handler's tracing method. The core may perform generational garbage collection.

20 Claims, 3 Drawing Sheets

GARBAGE COLLECTION EXTENSIBILITY VIA MANAGED CODE

BACKGROUND

In computer programming, garbage collection (GC) provides automatic memory management. A garbage collector tries to reclaim memory which holds objects that are no longer being used by any program. Garbage collection can free programmers from the need to manually release objects that are no longer needed, making programming easier. Garbage collection can also prevent some runtime errors. Many computer languages require garbage collection, or provide garbage collection as an option. Some languages allow both garbage collection and manual memory management in a given program.

Efficient implementation of garbage collection can be a high priority because garbage collectors may run frequently and at unpredictable times. Garbage collection is often integrated into the programming language's compiler and runtime system. In some cases, garbage collection can be added to an operating environment through libraries. Integrated garbage collection can be an efficient approach, because many garbage collectors operate by tracing connections (pointers, links, handles, references, etc.) between objects, in order to identify objects that cannot be accessed. Then the garbage collector reclaims the memory used by those unreachable objects.

However, in practice a garbage collector's behavior can be more complex. For example, in many programs the most recently created objects are also those most likely to soon become unreachable, so a generational garbage collector divides objects into generations and focuses on the objects in a subset of generations. This focus can provide faster garbage collection while still reclaiming most unreachable objects.

A desire for flexibility can also complicate garbage collector behavior, without diminishing the desire for efficient implementation of garbage collection. For instance, one may want the garbage collection of an object to trigger an action on another object. One may want to build weak caches, with different connections in an object graph having different strengths. One may want to track regions of memory that are used for I/O by memory-mapped devices, so the garbage collector won't unexpectedly change references to such regions.

SUMMARY

For efficiency and in line with tradition, many complexities of garbage collection behavior have been tightly integrated with the garbage collector, being implemented by code embedded inside the garbage collector. But tight integration can severely limit the flexibility of garbage collection.

Some embodiments described herein promote both efficiency and flexibility. From an architectural perspective, a garbage collector core can efficiently handle garbage collection of many objects, even in a multi-generational manner. The garbage collector core coordinates with garbage collector extension handlers to flexibly and efficiently support collection of special objects.

For example, one approach extends garbage collection functionality by designating a managed code class for specialized handling by the core during garbage collection, and obtaining a handler which is configured to accept notification from the core of internal garbage collection phases. The handler may be implemented in a managed programming language. The handler is registered with the core, to receive control from the core when the core encounters an object of the designated class during garbage collection. The handler can then take appropriate action, e.g., to form a list by threading together discovered objects of the designated class, to walk a list of objects of the designated class and detect whether any of those objects are unreachable, and/or to provide an executor for an object of the designated class, so the executor can be executed after the core finishes a garbage collection cycle.

Although the extension handler is not an integral part of the garbage collector core, the handler and the core can coordinate their activities in some embodiments. For example, the core may notify handlers through a phase notification interface to provide notification of internal garbage collection phase changes. Phase changes may mark the start of tracing of strong pointers, end of tracing of strong pointers, start of tracing of weak pointers, end of tracing of weak pointers, start of pointer update, end of pointer update, a pinning phase, a weak pointer forwarding phase, an untraced pointer relocation phase, and/or other phases.

Flexibility may also be provided in some embodiments by marking a class reference field as untraced, thereby instructing the core to ignore the reference during pointer tracing phases. If the core encounters an object which has a weak pointer field, the core can pass control by calling a tracing method of a handler. The core may skip an untraced pointer during a tracing phase. The core may include memory barrier code for generational garbage collection and/or concurrent garbage collection. A multi-generational core may bypass a previously encountered reachable object of the designated class during a tracing phase. Use of a global garbage collection data structure dedicated to tracking allocated objects can be avoided. Object efficiency can also be promoted by keeping a list of discovered allocated objects of the designated class in the handler and in the allocated object(s) instead of using a separate global table to keep track of allocated objects.

Viewing some embodiments from the core's perspective, when garbage collection encounters an object of a class which has been designated for specialized handling, the core passes control to a handler which has been registered to handle objects of the designated class. The core also notifies the handler (and possibly other handlers) of the core's internal garbage collection phase changes, while the core executes. For example, the core may notify multiple registered handlers that a garbage collection cycle is starting. Control may be passed to handler(s) at different points, e.g., the core may pass control to a handler after the core finishes a tracing phase and before the core finishes a pointer update phase. The core may be configured to pass control to the handler only if the core encounters an object of the designated class during a tracing phase.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
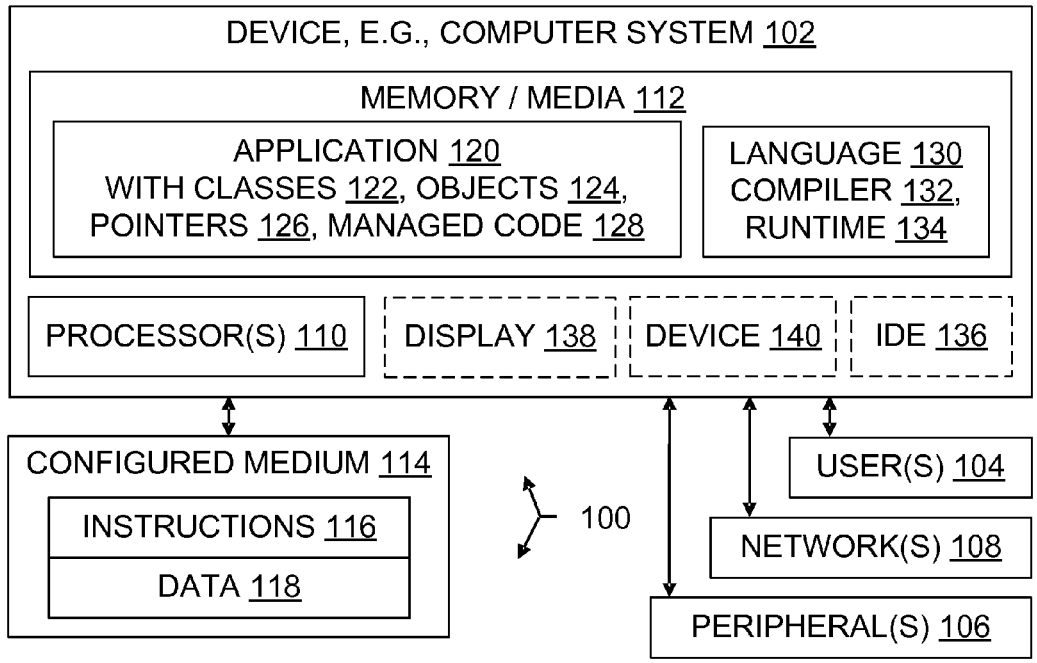
FIG. 1 is a block diagram illustrating a computer system having at least one processor, at least one memory, at least one application which uses the memory, and other items in an operating environment which may be present on multiple network nodes, and also illustrating configured storage medium embodiments.

In theory, when memory is handled through automatic garbage collection, a contract for reclaiming unused memory can be simple: given a set of root objects and the graph of connections between objects, all memory blocks that cannot be reached from the roots through a path in the graph can be safely reclaimed. However, this view is too simple to accommodate situations that call for more flexibility than a mere dead/alive dichotomy. For example, one may want the collection of an object to trigger an action on another object. One may want to build weak caches, where not all the connections in the object graph have the same strength. One may want to track regions of memory that are used for I/O and pin addresses such that the garbage collector won't relocate regions unexpectedly. Traditionally, these capabilities have been implemented by code that is tightly integrated with, and deep inside, the garbage collector.

For example, in familiar versions of the Microsoft® Common Language Runtime (CLR), the application is largely intermingled with the garbage collection (GC) code. A basic building block of these versions is a handle table. Entries in the handle table can point to objects in the GC heap. During a GC cycle, the garbage collector walks the table and (based on some flags specifying the purpose of each entry) pins the managed object, queues an executor if the object was collected, and so on. This approach is rigid, in that capabilities not already covered by the mechanism are difficult or impractical to implement. This approach may also fail to provide desired performance, because the handle table does not use the same mechanism for detecting cross-generational references as normal application code, which leads to scanning more objects than strictly necessary. Also, by using a system-wide facility, this approach involves locks, interlocked operations, extra memory, and other overhead.

By contrast, some embodiments described herein provide a way to add flexibility to interactions between the garbage collector and the mechanism(s) invoked to reclaim or otherwise manage memory. Instead of making the mechanisms a core part of the garbage collector, some embodiments extend behavior of the GC through the use of extension handlers. Extension handlers can have domain-specific knowledge, and can optimize for different scenarios. The extension handlers can also be written in a managed language, thus easing their integration into the runtime part of a system.

Some embodiments provide an express and discrete definition of the interactions between the core of the garbage collector and the extension handlers. Some provide a mechanism for marking class reference fields as weak or untraced, thus allowing strongly-typed code throughout the system. Some embodiments add an encoding for GC info that only affects a small subset of all GC infos and does not affect the hot path in the garbage collector. By storing discovered object lists in the handlers and their allocated objects, some embodiments promote a division of labor between target classes and their GC handlers, which reduces the memory overhead imposed on the objects.

Some embodiments described herein may be viewed in a broader context. For instance, concepts such as garbage collection, graphs, modularity, control flow, and notification may be relevant to a particular embodiment. However, it does not follow from the availability of a broad context that exclusive rights are being sought herein for abstract ideas; they are not. Rather, the present disclosure is focused on providing appropriately specific embodiments. Other media, systems, and methods involving garbage collection, graphs, modularity, control flow, notification and/or other broad concepts are outside the present scope. Accordingly, vagueness and accompanying proof problems are also avoided under a proper understanding of the present disclosure.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventor asserts and exercises his right to his own lexicography. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, cell or mobile phones, and/or device(s) providing one or more processors controlled at least in part by instructions. The instructions may be in the form of software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to synchronization, and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit. For example a hyper-threaded quad core chip running two threads per core has eight logical processors. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, and similar hardware interface software.

"Code" means processor instructions, data (which includes constants, variables, and data structures), or both instructions and data.

"Application" is used broadly herein, to include not only application programs in the lay sense (namely, applications as opposed to operating systems), but also kernels, drivers, interrupt handlers, libraries, and other code written by programmers (who are also referred to as developers).

"Automatically" means by use of automation (e.g., general purpose computing hardware configured by software for specific operations discussed herein), as opposed to without automation. In particular, steps performed "automatically" are not performed by hand on paper or in a person's mind; they are performed with a machine. However, "automatically" does not necessarily mean "immediately".

Throughout this document, use of the optional plural "(s)" means that one or more of the indicated feature is present. For example, "handler(s)" means "one or more handlers" or equivalently "at least one handler".

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as "transmitting", "sending", "communicating", "registering", "tracing", "passing", "notifying", or taking other action in regard to a destination may involve intervening action such as forwarding, copying, uploading, downloading, encoding, decoding, compressing, decompressing, encrypting, decrypting and so on by some other party, yet still be understood as being performed directly by the party of interest.

Whenever reference is made to data or instructions, it is understood that these items configure a computer-readable memory thereby transforming it to a particular article, as opposed to simply existing on paper, in a person's mind, or as a signal on a wire, for example.

Operating Environments

With reference to FIG. 1, an operating environment 100 for an embodiment may include a computer system 102. The computer system 102 may be a multiprocessor computer system, or not. An operating environment may include one or more machines in a given computer system, which may be clustered, client-server networked, and/or peer-to-peer networked.

Human users 104 may interact with the computer system 102 by using displays, keyboards, and other peripherals 106. System administrators, developers, engineers, and end-users are each a particular type of user 104. Automated agents acting on behalf of one or more people may also be users 104. Storage devices and/or networking devices may be considered peripheral equipment in some embodiments. Other computer systems not shown in FIG. 1 may interact with the computer system 102 or with another system embodiment using one or more connections to a network 108 via network interface equipment, for example.

The computer system 102 includes at least one logical processor 110. The computer system 102, like other suitable systems, also includes one or more computer-readable storage media 112. Media 112 may be of different physical types. The media 112 includes volatile memory, non-volatile memory, fixed in place media, removable media, magnetic media, and/or optical media, as opposed to media such as a wire that merely propagates a signal. In particular, a configured medium 114 such as a CD, DVD, memory stick, or other removable non-volatile memory medium may become functionally part of the computer system when inserted or otherwise installed, making its content accessible for use by processor 110. The removable configured medium 114 is an example of a computer-readable storage medium 112. Some other examples of computer-readable storage media 112 include built-in RAM, ROM, hard disks, and other storage devices which are not readily removable by users 104.

The medium 114 is configured with instructions 116 that are executable by a processor 110; "executable" is used in a broad sense herein to include machine code, interpretable code, and code that runs on a virtual machine, for example. The medium 114 is also configured with data 118 which is created, modified, referenced, and/or otherwise used by execution of the instructions 116. The instructions 116 and the data 118 configure the medium 114 in which they reside; when that memory is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by extended garbage collection as discussed herein, e.g., by notification, registration, designation, allocation, collection, binding, deployment, execution, modification, display, creation, loading, and/or other operations.

An application 120, which may include classes 122 defining objects 124, objects 124 connected by pointers 126, other unmanaged or managed code 128, and other items shown in the Figures, may reside partially or entirely within one or more media 112, thereby configuring those media. The application 120 is written in one or more programming languages 130, processed by a compiler 132 (or equivalently, an interpreter) into an executable form which runs in and is supported by a runtime 134, such as a version of the Microsoft® Common Language Runtime or another managed code runtime, for example. In addition to the processor(s) and memory, an operating environment may also include other hardware, such as display(s) 138, memory-mapped device(s) 140, buses, power supplies, and accelerators, for instance.

A given operating environment 100 may include an Integrated Development Environment (IDE) 136 which provides a developer with a set of coordinated software development tools. In particular, some of the suitable operating environments for some embodiments include or help create a Microsoft® Visual Studio® development environment (marks of Microsoft Corporation) configured to support program development. Some suitable operating environments include Java® environments (mark of Oracle America, Inc.), and some include environments which utilize languages such as C++ or C# ("C-Sharp"), but teachings herein are applicable with a wide variety of programming languages, programming models, and programs, as well as with endeavors outside the field of software development per se that use garbage collection.

One or more items are shown in outline form in FIG. 1 to emphasize that they are not necessarily part of the illustrated operating environment, but may interoperate with items in the operating environment as discussed herein. It does not follow that items not in outline form are necessarily required, in any Figure or any embodiment.

Systems

Figure 2:
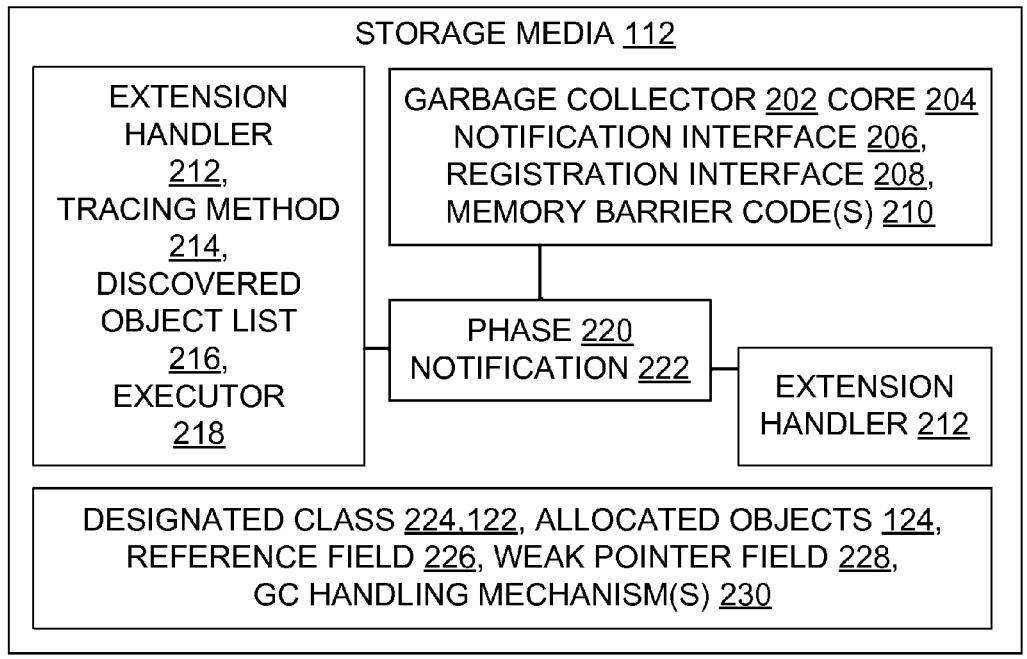
FIG. 2 is a block diagram illustrating garbage collection extensibility in an example architecture.

FIG. 2 illustrates an architecture which is suitable for use with some embodiments. A garbage collector 202 includes a core 204 and zero or more extension handlers 212. The core provides a notification interface 206 through which the handlers 212 can receive notification(s) 222 indicating the core's progress through specified phases 220 of a garbage collection cycle. Handlers 212 register with the core 204 through a registration interface 208, such as an explicitly called registration method of the core 204 or an implicit registration entry in a registry such as a Microsoft® Windows operating system registry. In some embodiments, the core 204 includes memory barrier code(s) 210 implementing multi-generational garbage collection and/or concurrent garbage collection, for example.

In some embodiments, a handler 212 includes a tracing method 214 which can be invoked to trace connections between objects 124 of a particular class 122, which is known as the designated class 224. In general, a handler 212 may be given control by the core 204 to handle garbage collection of objects of a particular single designated class 224, but a given handler may also be configured to handle objects of multiple designated classes 224. A given designated class 224 may also have more than one handler 212, e.g., a debug handler 212 and a production handler 212. A handler 212 may also include a list 216 head for a list of discovered objects 124 of the designated class(es), an executor 218 for objects 124 of the designated class(es), and/or other class-specific memory management code. For instance, a handler 212 may have code configured to handle reference fields 226 or weak pointer fields 228 in a particular way for a given class 224. A GC handling mechanism 230 identifies designated classes 224 and/or their particular objects 124 to the core 204.

Figure 3:
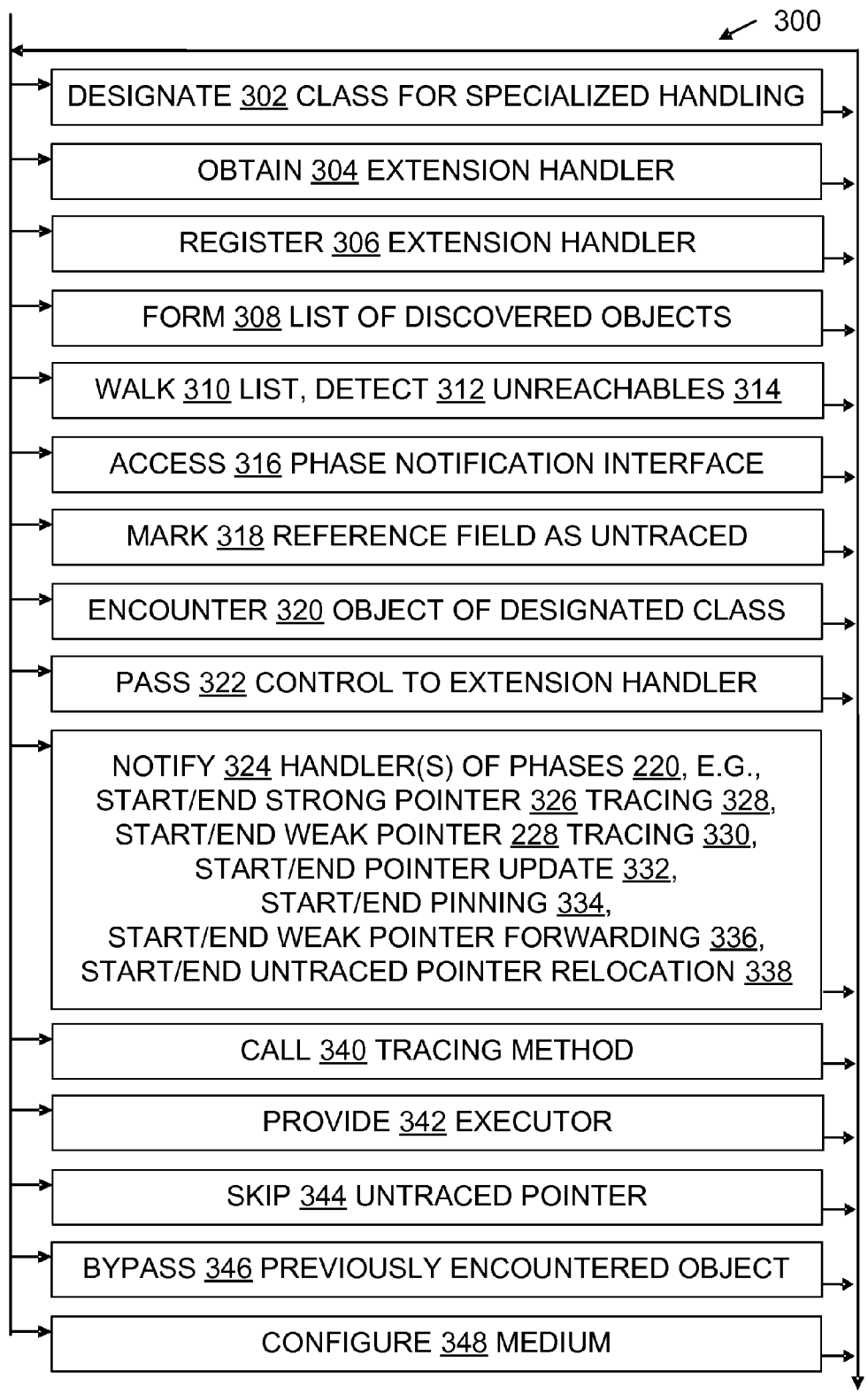
FIG. 3 is a flow chart illustrating steps of some process and configured storage medium embodiments.

With reference to FIGS. 1 through 3, some embodiments provide a computer system 102 with a logical processor 110 and a memory medium 112 (in operable communication with the logical processor) configured by circuitry, firmware, and/or software to transform a system by extending garbage collection functionality as described herein. A garbage collector core 204 residing in the memory has a phase notification interface 206 configured to provide notification 222 of internal garbage collection phases 220. One or more garbage collector extension handlers 212 residing in the memory are implemented in managed code, and are registered with the garbage collector core for handling garbage collection of objects 124 of a designated class 224.

In some embodiments, the garbage collector core 204 includes memory barrier code 210 for at least one of the following: generational garbage collection, concurrent garbage collection.

In some embodiments, the garbage collector core 204 phase notification interface 206 is structured to use flags, signals, and/or other familiar communication mechanisms to provide notification 222 of at least the following internal garbage collection phase 220 changes: start/end of garbage collection cycle, start/end of tracing of strong pointers, start/end of tracing of weak pointers, start/end of pointer update, start/end of a pinning phase, start/end of a weak pointer forwarding phase, start/end of an untraced pointer relocation phase. Other phase 220 changes may also be published through notification(s) 222.

In some embodiments, the garbage collector core 204 is configured to pass control to the garbage collector extension handler 212 only if the core encounters an object of the designated class 224 during a tracing phase.

In some embodiments, the system includes allocated objects 124 of the designated class (residing in the memory 112), and the system is free of any global garbage collection data structure dedicated to tracking these objects.

To promote a division of labor between target classes 224 and their GC handlers 212, which minimizes the memory overhead imposed on the objects, in some embodiments a list 216 of discovered allocated objects of the designated class 224 is located in the garbage collector extension handler 212 and in the allocated object(s) themselves rather than in a separate global data structure dedicated to that purpose. Some embodiments can readily and automatically take advantage of a multi-generational garbage collector core, because the collector would trace through a much smaller set of objects using such list(s) 216 than otherwise, and the extension handler 212 would only have to check the state of its listed objects, not the state of all allocated objects.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a system, such that no human user 104 interacts directly with the embodiment. Software processes may be users 104.

In some embodiments, the system includes multiple computers connected by a network. Networking interface equipment can provide access to networks 108, using components such as a packet-switched network interface card, a wireless transceiver, or a telephone network interface, for example, will be present in a computer system. However, an embodiment may also communicate through direct memory access, removable nonvolatile media, or other information storage-retrieval and/or transmission approaches, or an embodiment in a computer system may operate without communicating with other computer systems.

Processes

FIG. 3 illustrates some process embodiments in a flowchart 300. Processes shown in the Figures may be performed in some embodiments automatically, e.g., by a garbage collector core 204 and extension handler(s) 212 during execution of an application 120 during time periods involving no user input, or in a testbed under control of a script. Processes may also be performed in part automatically and in part manually (e.g., in response to developer commands during debugging) unless otherwise indicated. In a given embodiment zero or more illustrated steps of a process may be repeated, perhaps with different parameters or data to operate on. Steps in an embodiment may also be done in a different order than the top-to-bottom order that is laid out in FIG. 3. Steps may be performed serially, in a partially overlapping manner, or fully in parallel. The order in which flowchart 300 is traversed to indicate the steps performed during a process may vary from one performance of the process to another performance of the process. The flowchart traversal order may also vary from one process embodiment to another process embodiment. Steps may also be omitted, combined, renamed, regrouped, or otherwise depart from the illustrated flow, provided that the process performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different features, mechanisms, and/or data structures, for instance, and may otherwise depart from the examples provided herein.

During a class designating step 302, a developer or other user, or an embodiment operating on behalf of a user, designates a class 122 for specialized handling during garbage collection. Step 302 may be accomplished using a GC handling mechanism 230 such as a whitelist of designated classes 224 or a blacklist of non-designated classes 122, which is provided to the garbage collector core 204 in a file, list, or other data structure, for example. Alternately or in addition, a designating step 302 GC handling mechanism 230 may include marking each object 124 of a particular designated class 224 with a signature, GC info type field, or other GC handling identifier and having the core 204 check the objects it encounters to locate such identifiers.

During an extension handler obtaining step 304, a developer or other user, or an embodiment operating on behalf of a user, obtains a garbage collector extension handler 212 for performing specialized handling of designated class objects during garbage collection. Step 304 may be accomplished by obtaining a previously written handler 212 or by writing a handler 212, using file systems, IDEs 136, and other familiar tools, to thereby obtain a handler 212 which performs as described herein.

During a handler registering step 306, a developer or other user, or an embodiment operating on behalf of a user, registers an extension handler 212 for receiving notification(s) 222 and/or control from a core 204 during garbage collection. Step 306 may be accomplished using a registration interface 208, for example.

During a list forming step 308, an extension handler 212 in an embodiment operating on behalf of a user forms a list 216 of object(s) 124 that have been discovered (generally by the handler 212) during garbage collection. Step 308 may be accomplished by making a singly-linked list, doubly-linked list, circular list, tree, b-tree, hash table, or other list data structure by setting object pointers using familiar techniques, for example. The list 216 entries are objects of the designated class(es) 224 to which the handler 212 is tailored. In some embodiments, the head of the list 216 is in the handler 212 and the list storage (e.g., links, pointers) for nodes is co-located in the allocated objects themselves, rather than using the familiar approach of a separate global table to keep track of allocated objects.

During a list walking step 310, an extension handler 212 in an embodiment operating on behalf of a user walks a list of object(s) during garbage collection. Step 310 may be accomplished by traversing a list data structure by following object pointers using familiar techniques that are adapted by use in an extension handler 212, for example.

During a reachability detecting step 312, an extension handler 212 in an embodiment operating on behalf of a user detects unreachable object(s), such as unreachable objects in a list of object(s) during garbage collection. Objects 124 are "unreachables" 314 if they are unreachable by the application 120 for purposes of continued use that would be impeded by garbage collecting the memory occupied by the objects. Step 312 may be accomplished by traversing list data structure(s), comparing allocated object addresses with reachable object addresses, and other familiar techniques, for example, adapted by use in an extension handler 212.

During a GC phase notification interface accessing step 316, an extension handler 212 in an embodiment operating on behalf of a user accesses a core 204 notification interface 206. If the registration interface 208 is part of the notification interface 206 API (application program interface), then accessing step 316 may be accomplished by registering 306 the handler, during garbage collection or otherwise. Accessing step 316 may be accomplished during garbage collection by receiving a notification 222 of a core 204 phase 220 change.

During a reference field marking step 318, an embodiment operating on behalf of a user marks a reference field 226 as untraced, e.g., by setting a flag or entering the reference field in a list of untraced references. In response, the core 204 ignores the marked reference during garbage collection pointer tracing phase(s).

During an object encountering step 320, a garbage collector core 204 in an embodiment encounters an object 124 of a designated class 224 while following pointers or otherwise traversing objects during garbage collection. Step 320 may identify the object as belonging to a designated class 224 using any of the mechanisms used in designating step 302.

During a control passing step 322, a garbage collector core 204 in an embodiment passes flow of control to an extension handler 212 during garbage collection, in response to encountering 320 an object of the class 224 designated for specialized handling by that handler 212. The proper handler 212 may be identified using a jump table, vector table, list of registered handlers with their respective class identifiers and entry points for receiving control, and/or other mechanisms. Control passing step 322 may utilize familiar mechanisms for invoking, scheduling, threading, raising, interrupting, or otherwise passing flow of control between logically different pieces of code.

During a handler notifying step 324, a garbage collector core 204 in an embodiment notifies registered extension handler(s) 212 of phase 220 changes during garbage collection. In some embodiments, all registered handlers 212 receive notification 222 of each published phase change. Each handler 212 then acts on the notification (e.g., by asking for control if it doesn't already have it, and by performing steps such as forming 308 a list 216, walking 310 a list, and/or detecting 312 unreachable objects), or else ignores the notification (e.g., by immediately passing control back to the core or by not suspending execution of the core 204). In other embodiments, handlers 212 are registered only to receive specific notifications 222, and the core notifies 324 handlers only of the phase changes the handler has registered an interest in. Notifications may be sent to handlers 212 by bitflags, semaphores, signals, events, callbacks, messages, and/or other familiar inter-process communication mechanisms, for example.

More specifically, in some embodiments a core 204 notifies 324 handler(s) 212 of phase 220 changes such as: the start of strong pointer 326 tracing 328, the end of strong pointer 326 tracing 328, the start of weak pointer 228 tracing 330, the end of weak pointer 228 tracing 330, the start of pointer updating 332, the end of pointer updating 332, the start of pointer pinning 334, the end of pointer pinning 334, the start of weak pointer forwarding 336, the end of weak pointer forwarding 336, the start of untraced pointer relocating 338, and/or the end of untraced pointer relocating 338.

During a tracing method calling step 340, a garbage collector core 204 in an embodiment passes flow of control to an extension handler 212 tracing method 214 during garbage collection, e.g., by calling the method using an address or other identifier provided during registration 306. The tracing method may then walk 310 a list of objects and/or otherwise trace connections to determine object reachability, for example.

During an executor providing step 342, an extension handler 212 provides an executor 218 to a garbage collector core 204, e.g., as an address or other entry point identifier, so that the core 204 can pass control to the executor later in the garbage collection cycle. Executors 218 can thus be tailored to provide garbage collection handling which is specific to a designated class 224 rather than being generic to all allocated objects 124.

During an untraced pointer skipping step 344, a garbage collector core 204 skips (does not trace; ignores) a reference field 226 which has been marked 318 as untraced.

During an object bypassing step 346, a garbage collector core 204 that includes memory barrier code 210 to handle multiple generations of objects bypasses a previously encountered reachable object. Bypassing 346 may leave some reclaimable memory 112 still in use, but often helps provide faster garbage collection.

During a memory configuring step 348, a memory medium 112 is configured by a garbage collector core 204, an extension handler 212, a designation of a class 224, or otherwise in connection with extensible garbage collection architecture(s) as discussed herein.

The foregoing steps and their interrelationships are discussed in greater detail below, in connection with various embodiments.

From a developer perspective, some embodiments provide a process for extending garbage collection functionality in a computer system. The process includes designating 302 a managed code 128 class 224 for specialized handling by a garbage collector core 204 during garbage collection. The process obtains 304 a garbage collector extension handler 212 which is configured to accept notification 222 of internal garbage collection phases performed by the core 204, and registers 306 the handler 212 to receive (per step 322) control from the garbage collector core when the core encounters an object of the designated class 224 during garbage collection. For example, an embodiment may obtain a handler 212 that is configured to form 308 a list by threading together discovered objects of the designated class, to walk 310 a list of objects of the designated class, and/or to detect 312 whether objects are unreachable. In some embodiments, the registering step registers the handler to receive control from a multi-generational garbage collector core.

In some embodiments, the process includes accessing 316 a phase notification interface 206 of the garbage collector core. The interface 206 provides notification 222 of internal garbage collection phase changes, such as the start/end of tracing 328 of strong pointers, start/end of tracing 330 of weak pointers, and start/end of pointer update 332.

In some embodiments, the process includes marking 318 a class reference field as untraced, thereby instructing the garbage collector core 204 to ignore the reference during garbage collection pointer tracing phases.

From a core 204 perspective, some embodiments provide a process for garbage collection by an extended garbage collector (a core 204 with extension handler(s) 212). The process includes the core encountering 320 an object of a class 224 which has been designated for specialized handling, passing 322 control to a handler 212 which has been registered to handle objects of the designated class, and (before, during, or after passing control) notifying 324 the handler 212 of internal (e.g., to the core 204 or to GC overall) garbage collection phase change(s). For example, in some embodiments the core notifies 324 multiple registered garbage collector extension handlers 212 that a garbage collection cycle is starting. In some embodiments, the process also includes registering 306 the garbage collector extension handler 212.

In some embodiments, the core encounters 320 an object which has a weak pointer field 228, and passing 322 control includes calling 340 a tracing method 214 of the handler. In some embodiments, the core passes 322 control to the handler 212 after the core finishes a tracing phase and before the core finishes a pointer update phase.

In some embodiments, the handler 212 is implemented in a managed programming language 130. In some embodiments, the handler 212 forms 308 a list by threading together objects of the designated class. In some, the handler 212 detects 312 whether an object of the designated class is unreachable. In some, the handler 212 provides 342 an executor 218 for an object of the designated class, the executor meant to be executed after the core finishes a garbage collection cycle.

In some embodiments, the core 204 skips 344 an untraced pointer during a tracing phase. In some, the core 204 is multi-generational and the core bypasses 346 a previously encountered reachable object of the designated class during a tracing phase.

Figure 4:
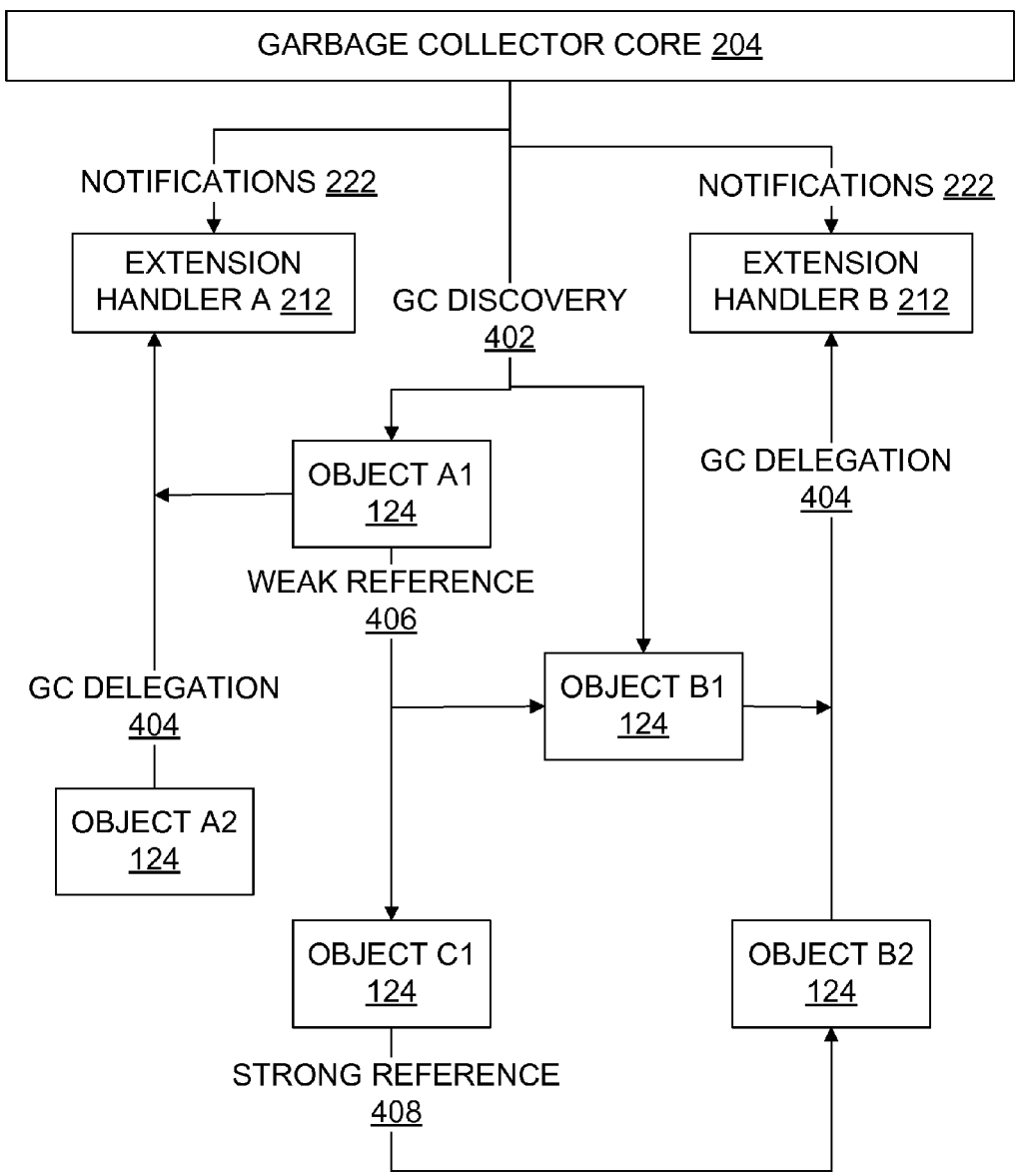
FIG. 4 is an example diagram illustrating relationships between a garbage collector core, extension handlers, and allocated objects.

FIG. 4 illustrates relationships between a garbage collector core 204, two extension handlers 212, and several allocated objects 124. In the FIG. 4 example, notifications 222 travel from the core 204 to extension handlers A and B. The core 204 discovers 402 objects A1 and A2 using familiar tracing mechanisms, for example. Garbage collection delegation 404 by the core to the handlers identifies objects A1, A2, B1, and B2. Weak references (weak pointers 228) are located 406 from object A1 to objects B1 and C1. A strong reference (strong pointer 326) is located 408 from object C1 to object B2. Other embodiments may have different relationships, and/or a different number of handler(s) 212 and/or objects 124.

Configured Media

Some embodiments include a configured computer-readable storage medium 112. Medium 112 includes disks (magnetic, optical, or otherwise), RAM, EEPROMS or other ROMs, and/or other configurable memory, as opposed to wires and other propagated signal media. The storage medium which is configured may be in particular a removable storage medium 114 such as a CD, DVD, or flash memory. A general-purpose memory, which may be removable or not, and may be volatile or not, can be configured into an embodiment using items such as garbage collector core 204 interface(s) 206, 208, extension handler(s) 212, and specialized GC handling class 224 designations, in the form of data 118 and instructions 116, read from a removable medium 114 and/or another source such as a network connection, to form a configured medium. The configured medium 112 is capable of causing a computer system to perform process steps for transforming data through extended garbage collection as disclosed herein. FIGS. 1 through 4 thus help illustrate configured storage media embodiments and process embodiments, as well as system and process embodiments. In particular, any of the process steps illustrated in FIG. 3, or otherwise taught herein, may be used to help configure a storage medium to form a configured medium embodiment.

ADDITIONAL EXAMPLES

Additional details and design considerations are provided below. As with the other examples herein, the features described may be used individually and/or in combination, or not at all, in a given embodiment.

Those of skill will understand that implementation details may pertain to specific code, such as specific APIs and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, these details are provided because they may help some readers by providing context and/or may illustrate a few of the many possible implementations of the technology discussed herein.

Some embodiments include an API as a definition of the interface layer between the core 204 of the garbage collector and the extension handlers 212:

```
abstract class CollectorExtensionHandler
{
    protected internal abstract void
StartOfStrongTracingPhase(DirectReferenceVisitor visitor);
        protected internal abstract void Tracing(object target);
        protected internal abstract void
EndOfStrongTracingPhase(DirectReferenceVisitor visitor);
        protected internal abstract void
StartOfWeakTracingPhase(DirectReferenceVisitor visitor);
        protected internal abstract void
EndOfWeakTracingPhase(DirectReferenceVisitor visitor);
        protected internal abstract void
PerformPinning(DirectReferenceVisitor visitor);
        protected internal abstract void
PerformWeakPointerForwarding(DirectReferenceVisitor visitor);
        protected internal abstract void
PerformUntracedPointerRelocation(DirectReferenceVisitor visitor);
        protected internal abstract void EndOfCollection( );
}
```

By getting notification 222 of the various phases of a garbage collection, the extension handler 212 can interact with the GC core 204 and perform specialized tasks.

In some embodiments, these are the steps taken by the garbage collector during a collection cycle. The garbage collector notifies 324 all the registered handlers 212 that a GC cycle is about to begin. A phase 220 change occurs: normal execution=>start of GC (no memory allocations can happen now). A phase change occurs: start of GC=>start of tracing phase. The garbage collector core 204 walks through an object 124 graph, processing all the unmarked objects it reaches. When the garbage collector core encounters 320 an object with a weak pointer field, it will search for the associated specialized handler 212 and call that handler's tracing method 214. Different handlers may perform different actions, although the most common operation may be to build a list 216 of interesting objects, such as objects that might be unreachable 314.

Continuing the cycle, a phase change occurs: start of tracing phase=>end of tracing phase. A phase change occurs: end of tracing phase=>start of post tracing phase. Again at this point, different handlers 212 may perform different actions, but a common operation would be to walk 310 through the list 216 of interesting objects 124 built in the previous phases and detect 312 those that have become unreachable. Detection triggers a reaction, which can be as simple as clearing out a field (and thus can be executed in place) or something more complicated that would be deferred to a later stage of the cycle.

Continuing the cycle, a phase change occurs: start of post tracing phase=>end of post tracing phase. A phase change occurs: end of post tracing phase=>pointer update phase. A phase change occurs: pointer update phase=>end of collection (memory allocations are allowed now). At this point, the deferred execution of executors 218 can be performed or otherwise scheduled. Each specialized handler can implement a different memory management policy, in the executors and otherwise.

In some embodiments, in order to participate in the GC extension a class will inherit from SpecialObject:

```
public abstract class SpecialObject
{
    internal abstract CollectorExtensionHandler GetHandler( )
}
```

In some embodiments, during a GC cycle the garbage collector core 204 will go through all the objects 124 reachable from an application's root set. When the core encounters 320 an instance of a subclass 224 of SpecialObject, the core will detect that designation through the particular encoding of the instance's GC info. At that point, the GC core 204 will delegate further actions to the extension handler 212 associated with the class 224. As mentioned above, the most typical action at this point may be to thread the discovered objects into a linked list 216.

It will be appreciated that since the set of objects to be acted upon are discovered during garbage collection, some embodiments do not maintain any global data structure to track those objects. This approach makes allocation of special objects as cheap and fast as allocation of normal objects.

Some embodiments process only the subset of special objects that are involved in the current garbage collection cycle. This can be beneficial with a generational GC in which a goal is to touch as little heap as possible. Checking only a thousand items rather than a million items would provide a significant performance gain.

In a generational or concurrent GC, accesses to memory are guarded by memory barriers, checks that are inserted into the code by a just-in-time compiler or an ahead-of-time compiler. Because the GC extension infrastructure is built on top of same language 130 concepts used by the rest of the system (e.g., field accesses, virtual method calls), the handlers 212 and the core 204 can utilize capabilities such as card marking for tracking cross-generational references for free as it were, without modifying the behavior of the runtime 134. This facilitates generational GC.

However, writing the extension handlers 212 in a managed language means the handlers will execute code within the context of the garbage collector thread, building temporary data structures while the GC is running. Accordingly, untraced pointers are available in some embodiments. An untraced pointer operates like any other reference field, except that it is skipped 344 by the GC. An untraced pointer's location is not registered in the GC info as holding a pointer, thus it's skipped during the tracing phase. This allows an embodiment to create temporary data structures (data structures that will be undone at the end of a GC) while leaving the object graph intact.

One use of untraced pointers is for threading the discovered objects together:

```
public class WeakReference<T> : SpecialObject where T : class
{
    [WeakPointer]
    T m_target;
    [UntracedPointer]
    WeakReference<T> m_next;
}
```

The code above is a skeleton for a WeakReference class that allows a program to refer to some object without forcing the GC to keep the object alive. When the GC detects that the target object is no longer strongly connected to the root set, the extension handler will clear the pointer, thus maintaining the integrity of the heap.

The code below is an example for the associated handler 212 in some embodiments:

```
internal abstract class Handler<WR> : CollectorExtensionHandler where WR : WeakReference<T>
{
    [UntracedPointer]
    WeakReference<T> m_head;
    protected internal override void Tracing(object target)
    {
        var obj = (WeakReference<T>) target;
        // only put it in the list to notify if it is making a transition to null
        if (obj.m_target != null) {
            obj.m_next = m_head;
            m_head = obj;
        }
    }
    protected internal override void
    EndOfStrongTracingPhase(DirectReferenceVisitor visitor)
    {
        for (var next = m_head; next != null;) {
            var ptr = next;
            next = next.m_next;
            // Undo the temporary linked list.
            ptr.m_next = null;
            if (!visitor.HasAlreadyBeenFoundReachable(ptr.m_target)) {
                // The target is not longer alive, clear the reference.
                ptr.m_target = null;
            }
        }
    }
}
```

In this example, "Tracing" is the delegation method 214 called by the core 204 for each discovered instance of the WeakReference<T> class. "EndOfStrongTracingPhase" is one of the notification 222 events from the GC core 204. The handler 212 walks the list 216 of discovered objects 124 and queries the GC core for the liveness of the target field. If the target object is not alive, the handler 212 cleans up the field.

CONCLUSION

Although particular embodiments are expressly illustrated and described herein as processes, as configured media, or as systems, it will be appreciated that discussion of one type of embodiment also generally extends to other embodiment types. For instance, the descriptions of processes in connection with FIG. 3 also help describe configured media, and help describe the operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific features of an example may be omitted, renamed, grouped differently, repeated, instantiated in hardware and/or software differently, or be a mix of features appearing in two or more of the examples. Functionality shown at one location may also be provided at a different location in some embodiments.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims as filed are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A process of extending garbage collection functionality in a computer system, the process comprising the steps of:
designating a managed code class for specialized handling by a garbage collector core during garbage collection;
obtaining a garbage collector extension handler which is configured to accept notification of internal garbage collection phases;
registering the garbage collector extension handler to receive control from the garbage collector core when the garbage collector core encounters an object of the designated managed code class during garbage collection; and
marking a class reference field as untraced, thereby instructing the garbage collector core to ignore the reference during garbage collection pointer tracing phases.

2. The process of claim 1, wherein the obtaining step obtains a garbage collector extension handler which is also configured to do at least one of the following:
form a list by threading together discovered objects of the designated managed code class;
walk a list of objects of the designated managed code class and detect whether any of those objects are unreachable.

3. The process of claim 1, further comprising the step of accessing a phase notification interface of the garbage collector core, the interface providing for notification of at least the following internal garbage collection phase changes:
start of tracing of strong pointers;
end of tracing of strong pointers;
start of tracing of weak pointers;
end of tracing of weak pointers;
start of pointer update;
end of pointer update.

4. The process of claim 1, wherein the registering step registers the garbage collector extension handler to receive control from a multi-generational garbage collector core.

5. The process of claim 1, further comprising the garbage collector core notifying multiple registered garbage collector extension handlers that a garbage collection cycle is starting.

6. A computer-readable storage medium configured with data and with instructions that when executed by at least one processor causes the processor(s) to perform a process for garbage collection with an extended garbage collector, the process comprising the steps of:
encountering during execution of a garbage collector core an object of a class which has been designated for specialized handling;
passing control at least once from the garbage collector core to a garbage collector extension handler which has been registered to handle objects of the designated class; and
notifying the garbage collector extension handler of at least one internal garbage collection phase change during execution of the garbage collector core;
wherein the encountering step includes encountering an object which has a weak pointer field, and the control passing step includes calling a tracing method of the handler.

7. The configured medium of claim 6, further comprising the garbage collector core notifying multiple registered garbage collector extension handlers that a garbage collection cycle is starting.

8. The configured medium of claim 6, wherein the process passes control from the garbage collector core to the garbage collector extension handler after the core finishes a tracing phase and before the garbage collector core finishes a pointer update phase.

9. The configured medium of claim 6, wherein the process further comprises registering the garbage collector extension handler, and the garbage collector extension handler is implemented in a managed programming language.

10. The configured medium of claim 6, wherein the process further comprises the garbage collector extension handler performing at least one of the following:
forming a list by threading together objects of the designated class;
detecting whether an object of the designated class is unreachable;
providing an executor for an object of the designated class, the executor to be executed after the garbage collector core finishes a garbage collection cycle.

11. The configured medium of claim 6, wherein the process further comprises the garbage collector core skipping an untraced pointer during a tracing phase.

12. The configured medium of claim 6, wherein the garbage collector core is multi-generational in that the process further comprises the garbage collector core bypassing a previously encountered reachable object of the designated class during a tracing phase.

13. The configured medium of claim 6, wherein the process further comprises a garbage collector extension handler doing at least one of the following:
forming a list by threading together discovered objects of the designated class;
walking a list of objects of the designated class and detecting whether any of those objects are unreachable.

14. A computer system comprising:
a logical processor;
a memory in operable communication with the logical processor;
a garbage collector core residing in the memory and having a phase notification interface configured to provide notification of internal garbage collection phases;
at least one garbage collector extension handler residing in the memory, the garbage collector extension handler implemented in managed code, and registered with the garbage collector core for handling garbage collection of objects of a designated class; and
allocated objects of the designated class and a list of discovered allocated objects of the designated class, wherein a head of the list is located in the garbage collector extension handler and storage of the list is co-located in the allocated objects.

15. The system of claim 14, wherein the garbage collector core includes memory barrier code for at least one of the following: generational garbage collection, concurrent garbage collection.

16. The system of claim 14, wherein the garbage collector core phase notification interface is structured to provide notification of at least the following internal garbage collection phase changes:
- start of garbage collection cycle;
- end of garbage collection cycle;
- start of tracing of strong pointers;
- end of tracing of strong pointers;
- start of tracing of weak pointers;
- end of tracing of weak pointers;
- start of pointer update;
- end of pointer update.

17. The system of claim 14, wherein the garbage collector core phase notification interface is structured to provide notification of at least the following:
- a pinning phase;
- a weak pointer forwarding phase;
- an untraced pointer relocation phase.

18. The system of claim 14, wherein the garbage collector core is configured to pass control to the garbage collector extension handler only if the garbage collector core encounters an object of the designated class during a tracing phase.

19. The system of claim 14, wherein the system further comprises allocated objects of the designated class and the system is free of any global garbage collection data structure dedicated to tracking these objects.

20. The system of claim 14, further comprising an executor for an object of the designated class, to be executed after the garbage collector core finishes a garbage collection cycle.

* * * * *